(12) United States Patent
Barkan

(10) Patent No.: US 7,701,861 B1
(45) Date of Patent: *Apr. 20, 2010

(54) PHYSICAL LAYER AND PHYSICAL LAYER DIAGNOSTIC SYSTEM WITH REVERSED LOOPBACK TEST

(75) Inventor: Ozdal Barkan, Mountain View, CA (US)

(73) Assignee: Marvell International Ltd., Hamilton (BM)

( * ) Notice: Subject to any disclaimer, the term of this patent is extended or adjusted under 35 U.S.C. 154(b) by 178 days.

This patent is subject to a terminal disclaimer.

(21) Appl. No.: 11/901,694

(22) Filed: Sep. 18, 2007

Related U.S. Application Data

(63) Continuation of application No. 10/096,211, filed on Mar. 8, 2002, now Pat. No. 7,272,114.

(60) Provisional application No. 60/345,467, filed on Oct. 24, 2001.

(51) Int. Cl.
*H04J 1/16* (2006.01)
*H04L 12/56* (2006.01)

(52) U.S. Cl. ........................ 370/248; 370/282; 709/250; 710/38

(58) Field of Classification Search ................ 370/246, 370/248, 282; 709/250; 710/38
See application file for complete search history.

(56) References Cited

U.S. PATENT DOCUMENTS

| 5,465,250 | A | | 11/1995 | Brief | 370/249 |
|---|---|---|---|---|---|
| 5,553,059 | A | | 9/1996 | Emerson et al. | 370/248 |
| 5,802,073 | A | | 9/1998 | Platt | 714/733 |
| 5,867,535 | A | * | 2/1999 | Phillips et al. | 375/295 |
| 6,052,362 | A | | 4/2000 | Somer | 370/246 |
| 6,072,803 | A | | 6/2000 | Allmond et al. | 370/445 |
| 6,215,816 | B1 | | 4/2001 | Gillespie et al. | 375/219 |
| 6,237,054 | B1 | | 5/2001 | Freitag, Jr. | 710/72 |

OTHER PUBLICATIONS

IEEE Std 802.3-2002 (Revision of IEEE Std 802.3, 2000 Edition); IEEE Standard for Information Technology—Telecommunications and information exchange between systems—Local and metropolitan area networks—Specific requirements, Part 3: Carrier sense multiple access with collision detection (CSMA/CD) access method and physical layer specifications; IEEE Computer Society, Sponsored by the LAN/MAN Standards Committee; Mar. 8, 2002; 1538 pages.

* cited by examiner

*Primary Examiner*—John Pezzlo

(57) ABSTRACT

A physical layer and a physical layer diagnostic system allow the physical layer of a network device to be tested without requiring the physical layer to be connected to a medium access controller. The physical layer includes a medium-side interface. A plurality of digital circuits in the physical layer communicate with the medium-side interface. A medium communicates with the medium-side interface. A packet generating device is connected to the medium and generates data packets that are transmitted over the medium to the medium-side interface, through the plurality of digital circuits of the physical layer and back to the packet generating device.

38 Claims, 2 Drawing Sheets

PHYSICAL LAYER AND PHYSICAL LAYER DIAGNOSTIC SYSTEM WITH REVERSED LOOPBACK TEST

CROSS-REFERENCE TO RELATED APPLICATIONS

This application is a Continuation of U.S. patent application Ser. No. 10/096,211, filed Mar. 8, 2002 (issued as U.S. Pat. No. 7,272,114 on Sep. 18, 2007), which application claims the benefit of U.S. Provisional Application No. 60/345,467, filed Oct. 24, 2001, which is hereby incorporated by reference.

FIELD OF THE INVENTION

The present invention relates to network devices, and more particularly to physical layers and physical layer diagnostic systems and methods.

BACKGROUND OF THE INVENTION

A physical layer (PHY) of a network device is a lowest layer of an ISO/OSI reference model for standardizing computer-to-computer communications. A medium access controller (MAC) forms part of a data-link layer, which is the next lowest layer. The PHY establishes and maintains a physical link between communicating devices. The MAC manages access to the physical network, delimits frames, and handles error control. The PHY and MAC are described further in IEEE section 802.3, which is hereby incorporated by reference.

A standard loopback test is typically used by original equipment manufacturers (OEMs) to evaluate a connection between the MAC and the PHY. The standard loopback test also allows evaluation of digital circuits within the PHY and the MAC. Referring now to FIG. 1, a MAC 12 typically forms part of an application specific integrated circuit (ASIC) 14. The MAC 12 communicates with a PHY 16. The PHY 16 is connected by one or more transformers 18 to a medium connector 20 such as an RJ-45 connector. When an optical fiber connector is used, the transformer is not used. A medium 22 such as Category 5 (CAT 5) cable or optical fiber is connected to the medium connector 20. The PHY 16 includes a MAC-side interface 24 and a medium-side interface 26.

During the standard loopback test, a CPU 28 generates data packets that are transmitted to the MAC 12. The MAC 12 sends the data packets to the MAC-side interface 24 of the PHY 16. The PHY 16 routes the packets through one or more PHY digital circuits and sends the data packets back to the MAC 12. The MAC 12 sends the data packets back to the CPU 28. The CPU 28 compares the transmitted and received packets to evaluate the MAC 12, the PHY 16 and/or a connection 29 therebetween.

Typically the PHY 16 disables a receiver that communicates with the medium-side interface 26. Alternately, the PHY 16 transmits idles during the standard loopback test. The data packets generated by the MAC 12 usually traverse multiple digital circuits within the PHY 16 before being looped back to the MAC 12. As a result, the operation of the digital circuits can be evaluated.

Alternately, a testing device 30 is connected to the medium 22. The testing device 30 can be a PC with packet generating and comparing circuits or testing equipment such as Smart-Bits or IXIA. The testing device 30 sends data packets to the medium-side interface 26 of the PHY 16. The data packets travel through the PHY 16 and the MAC 12 and back to the testing device 30. The testing device 30 compares the transmitted and received data packets to evaluate the MAC 12, the PHY 16 and/or the connection.

Sometimes the PHY 16 needs to be evaluated before the ASIC 14 incorporating the MAC 12 is available. For example, OEMs may need to evaluate the PHY 16 before the ASICs 14 are available. Even if the ASIC 14 is available, the ASIC 14 may not operate properly. It is common for the ASIC 14 to be delayed due to manufacturing problems and/or bugs such as software or hardware bugs. As a result, it is also common for testing of the PHY 16 to be delayed. These ASIC-related problems cause delays in discovering problems with the PHYs 16 that may have been discovered and fixed at an earlier stage.

The PHY 16 often supports multiple interfaces. A PHY evaluation board for testing the PHY 16 must have MACs 12 that support each of the supported interfaces to test the interoperability of the PHY 16. However, it may be impractical to have all of the MACs 12 on the PHY evaluation board when the PHY 16 supports more than a few interfaces.

Another problem with the standard loopback test relates to the generation of data packets. The MACs 12 do not generate packets or include packet generating or packet comparing logic. Therefore, packet generating and packet comparing logic must also be included on the PHY evaluation board.

SUMMARY OF THE INVENTION

A diagnostic system according to the present invention tests a physical layer of a network device for an Ethernet network without requiring the physical layer to be connected to a medium access controller. The physical layer includes a medium-side interface. A plurality of digital circuits in the physical layer communicate with the medium-side interface. A medium communicates with the medium-side interface. A packet generating device communicates with the medium and generates data packets that are transmitted by the medium to the medium-side interface, through the plurality of digital circuits of the physical layer and back to the packet generating device.

In other features of the invention, the plurality of digital circuits include at least two devices selected from a group including transmitters, receivers, digital signal processors (DSP), and physical coding sublayers (PCS).

In still other features, the physical layer includes a receiver. A first digital signal processor (DSP) communicates with the receiver. A first physical coding sublayer (PCS) communicates with the first DSP.

In yet other features, an output of the first PCS communicates with a MAC-side interface of the physical layer. The physical layer further includes a first in first out (FIFO) buffer. A second PCS communicates with the FIFO buffer. A transmitter communicates with the second PCS.

In other features, the physical layer further includes a first multiplexer (MUX) having inputs that communicate with the MAC-side interface and with the output of the first PCS. An output of the first MUX communicates with the FIFO buffer. The receiver of the physical layer generates a recovered clock that is input to the first PCS.

In still other features, the physical layer further includes a second MUX having inputs that communicate with the recovered clock and to a second clock. An output of the second MUX communicates with the FIFO buffer. The transmitter has a transmitter clock output that communicates with the FIFO buffer.

In yet other features, the packet generating device compares transmitted data packets with received data packets to evaluate the physical layer and a connection between the packet generating device and the physical layer.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
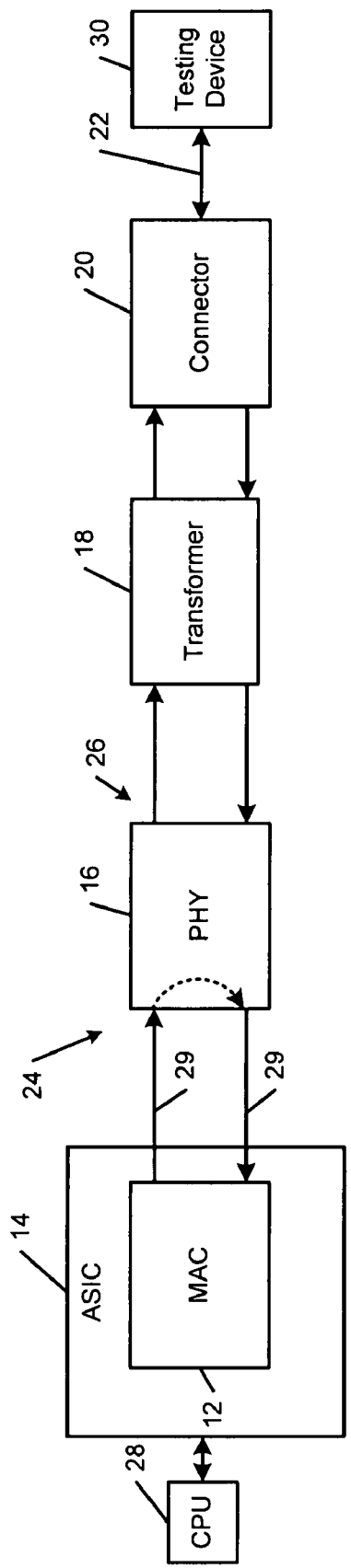
FIG. 1 is a functional block diagram of a standard loopback test for a MAC and a PHY according to the prior art.
Figure 2:
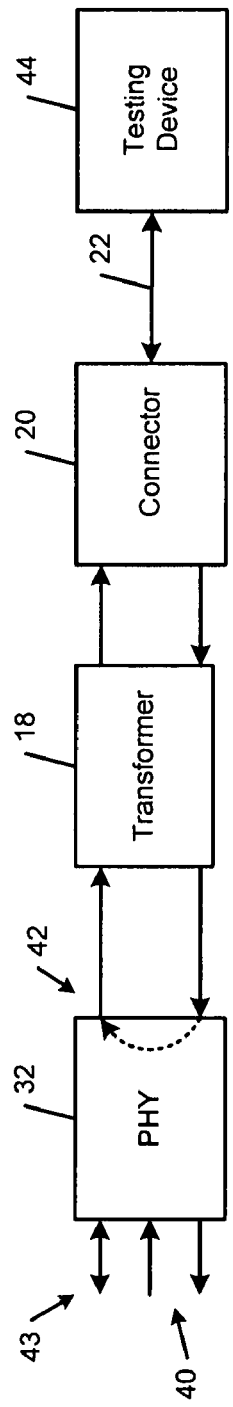
FIG. 2 is a functional block diagram of a PHY and a diagnostic system for the PHY according to the present invention.

Referring now to FIG. 2, a PHY 32 and a diagnostic system for the PHY 32 according to the present invention are shown. For purposes of clarity, reference numbers from FIG. 1 are used in FIG. 2 to identify similar elements. The present invention allows the operation of the PHY 32 to be evaluated without requiring a MAC, a connection to a MAC, or an expensive PHY evaluation board. The PHY 32 includes a MAC-side interface 40, a medium-side interface 42, and a serial management interface (SMI) 43.

A testing device 44 is connected to the medium 22. The reverse loopback test sends data packets from the testing device 44 to the medium-side interface 42 of the PHY 32, through one or more digital circuits of the PHY 32 and back to the testing device 44. The testing device 44 can be a standard network PC or commercially available network test equipment such as SmartBits or IXIA. The medium 22 can be CAT 5 cable, optical fiber or any other suitable medium that supports 10 BASE T, 100 BASE T, 1000 BASE T, 1000BASE LX and/or 1000BASE SX.

The PHY 32 preferably supports 10 BASE T, 100 BASE T, and/or 1000 BASE T and one or more of the following interfaces: Gigabit Media Independent Interface (GMII), Media Independent Interface (MII), Ten Bit Interface (TBI), Reduced Gigabit Media Independent Interface (RGMII), Modified Media Independent Interface (MMII), Reduced Ten Bit Interface (RBTI), Serial Gigabit Media Independent Interface (SGMII), and Serializer/Deserializer (SERDES).

Figure 3:
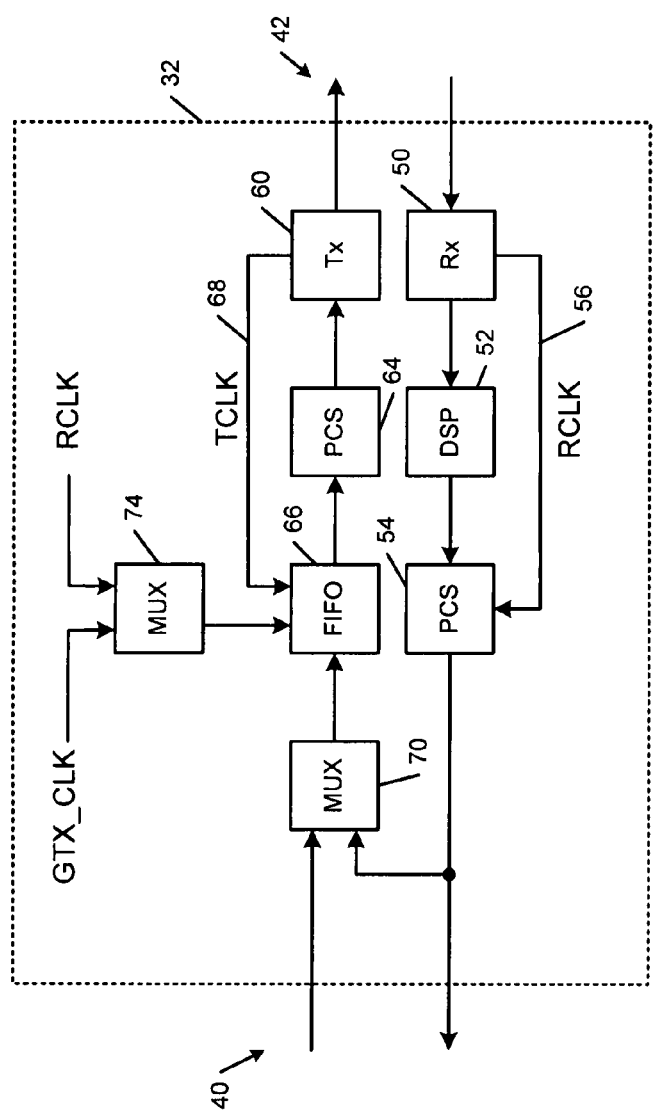
FIG. 3 is a functional block diagram of the PHY of FIG. 2 in further detail.

Referring now to FIG. 3, the PHY 32 according to the present invention is shown in further detail. The PHY 32 includes a receiver 50 that receives signals that are input to the medium-side interface 42. The receiver 50 is connected to a digital signal processor (DSP) 52. The DSP 52 is connected to a first physical coding sublayer (PCS) 54. A recovered clock RCLK 56 is output by the receiver 50 and is input to the first PCS 54.

The PHY 32 further includes a transmitter 60 that is connected to an output of a second PCS 64. The second PCS 64 is connected to an output of a first in first-out (FIFO) buffer 66. A transmitter clock 68 is generated by the transmitter 60 and is input to the FIFO buffer 66. An output of the first PCS 54 is connected to a first input of a first multiplexer (MUX) 70. An output of the first MUX 70 is connected to an input of the FIFO buffer 66. A second input of the first MUX 70 receives signals that are input to the MAC-side interface 40. A first input of a second MUX 74 is connected to the recovered clock RCLK 56. A second input of the second MUX 74 is connected to a GMII clock GTX_CLK 76. An output of the second MUX 74 is connected to an input of the FIFO buffer 66.

The reverse loopback test according to the present invention allows the operation of the PHY 32 to be evaluated without requiring a MAC. Even if a MAC is available, the operation of the PHY 32 can be evaluated independently of the MAC, which is particularly useful during debugging. In other words, the PHY can be tested and eliminated as a source of the bug. A connection between the PHY 32 and the testing device 44 may also be evaluated.

Required testing equipment includes standard network equipment such as PCs and switches or commercially available network test equipment such as SmartBits and IXIA. The required testing equipment generates data packets and compares received data packets to transmitted data packets. The testing equipment preferably identifies packet content, packet spacing, packet speed, packet errors, packet size and/or other pertinent packet characteristics.

In use, the testing device 44 generates traffic (data packets) that are input to the medium-side interface of the PHY 32. The data packets travel through multiple digital circuits of the PHY 32. The PHY 32 transmits the data back to the testing device 30 via the medium 22. The present invention allows the testing of the logic of the PHY 32, echo cancellation, DSP and PCS blocks, bit error rate (BER), cable performance, and other aspects of PHY 32 functionality. The reverse loopback test also allows evaluation of device magnetics, electromagnetic interference (EMI), and power consumption.

Figure 4:
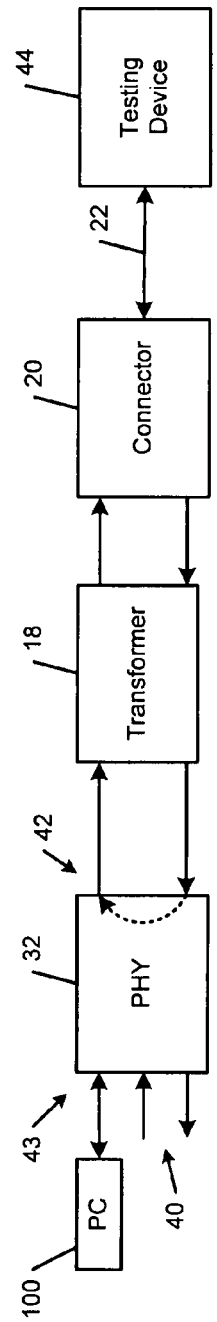
FIG. 4 is a functional block diagram that is similar to FIG. 2 and that includes a PC that is connected to a serial management interface of the PHY to read and/or write registers of the PHY.

Referring now to FIG. 4, a PC 100 may be temporarily connected to the PHY 32. The PC 100 drives the SMI 43 of the PHY 32 to read and/or write to registers of the PHY 32. A jig (not shown), conductors and/or solder may be used to connect the PC 100 to the PHY 32.

As can be appreciated, the PHY can be implemented as software that is executed by a processor and memory. The PHY can also be implemented as discrete circuits, application specific integrated circuit(s), or in any other suitable manner.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A diagnostic system comprising:
 a physical layer device including
  a medium-side interface and a receiver that communicates with the medium-side interface,
  a first digital signal processor (DSP) that communicates with the receiver, and
  a first physical coding sublayer (PCS) that communicates with the first DSP; and a packet generating device that transmits data packets over a medium to the medium-side interface of the physical layer device, wherein the data packets travel through the receiver, the first DSP and the first PCS of the physical layer device and back to the packet generating device without traveling to a medium access controller.

2. The diagnostic system of claim 1, wherein the first PCS communicates with a media access control (MAC)-side interface of the physical layer device.

3. The diagnostic system of claim 2, wherein the physical layer device further includes:
a first in first out (FIFO) buffer;
a second PCS that communicates with the FIFO buffer; and
a transmitter that communicates with the second PCS.

4. The diagnostic system of claim 3, wherein the physical layer device further includes:
a first multiplexer (MUX) that communicates with the MAC-side interface and with the first PCS, and
an output that communicates with the FIFO buffer.

5. The diagnostic system of claim 4, wherein the receiver of the physical layer device generates a recovered clock that is input to the first PCS.

6. The diagnostic system of claim 5, wherein the physical layer device further comprises a second MUX that communicates with the recovered clock and to a second clock.

7. The diagnostic system of claim 6, wherein the transmitter has a transmitter clock output that communicates with the FIFO buffer.

8. The diagnostic system of claim 7, wherein the second clock includes a gigabit medium independent interface (GMII) clock.

9. The diagnostic system of claim 1, further comprising a transformer arranged between the medium-side interface and the medium.

10. The diagnostic system of claim 1, wherein the packet generating device compares transmitted data packets to received data packets to evaluate operation of the physical layer device.

11. The diagnostic system of claim 1, wherein the physical layer device is implemented in software.

12. The diagnostic system of claim 1, wherein diagnostic system supports 10 BASE T, 100 BASE T, 1000 BASE T, 1000BASE LX and/or 1000BASE S.

13. The diagnostic system of claim 1, wherein the physical layer device complies with IEEE section 802.3.

14. A diagnostic system comprising:
a physical layer device including:
a medium-side interface and a plurality of digital circuits that communicate with the medium-side interface, and
a packet generating device that transmits data packets over a medium to the medium-side interface of the physical layer device, and wherein the data packets travel through the plurality of digital circuits of the physical layer device and back to the packet generating device without traveling to a medium access controller; and
a transformer arranged between the medium-side interface and the medium.

15. The diagnostic system of claim 14, wherein the plurality of digital circuits include at least two circuits selected from a group including transmitters, receivers, digital signal processors (DSP), and physical coding sublayers (PCS).

16. The diagnostic system of claim 14, wherein the physical layer device includes:
a receiver;

a first digital signal processor (DSP) that communicates with the receiver; and
a first physical coding sublayer (PCS) that communicates with the first DSP.

17. The diagnostic system of claim 15, wherein the first PCS communicates with a MAC-side interface of the physical layer device.

18. The diagnostic system of claim 17, wherein the physical layer device further includes:
a buffer;
a second PCS that communicates with the buffer; and
a transmitter that communicates with the second PCS.

19. The diagnostic system of claim 18, wherein the physical layer device further includes a first multiplexer (MUX) that communicates with the MAC-side interface, with the output of the first PCS and the buffer.

20. The diagnostic system of claim 19, wherein the receiver of the physical layer device generates a recovered clock that is input to the first PCS.

21. The diagnostic system of claim 20, wherein the physical layer device further comprises:
a second MUX that communicates with the recovered clock, a second clock, and the buffer.

22. The diagnostic system of claim 21, wherein the transmitter has a transmitter clock output that communicates with the buffer.

23. The diagnostic system of claim 22, wherein the second clock includes a gigabit medium independent interface (GMII) clock.

24. The diagnostic system of claim 14, wherein the packet generating device compares transmitted data packets to received data packets to evaluate operation of the physical layer device.

25. The diagnostic system of claim 14, wherein the physical layer device is implemented in software.

26. The diagnostic system of claim 14, wherein diagnostic system supports 10 BASE T, 100 BASE T, 1000 BASE T, 1000BASE LX and/or 1000BASE S.

27. The diagnostic system of claim 14, wherein the physical layer device complies with IEEE section 802.3.

28. A physical layer device comprising:
a medium-side interface including an input and an output;
a plurality of digital circuits that communicate with the medium-side interface, wherein data packets travel from the input, through the plurality of digital circuits of the physical layer device, and back to the output during testing without traveling to a medium access controller;
a receiver connected to the input;
a first digital signal processor (DSP) that communicates with the receiver; and
a first physical coding sublayer (PCS) that communicates with the first DSP.

29. The physical layer device of claim 28, wherein the first PCS communicates with a media access control (MAC)-side interface of the physical layer device.

30. The physical layer device of claim 29, further comprising:
a buffer;
a second PCS that communicates with the buffer; and
a transmitter that communicates with the second PCS and the output.

31. The physical layer device of claim 30, wherein the physical layer device further includes:
a first multiplexer (MUX) that communicates with the MAC-side interface the first PCS, and the buffer.

32. The physical layer device of claim 31, wherein the receiver of the physical layer device generates a recovered clock that is input to the first PCS.

33. The physical layer device of claim 32, further comprising:
- a second MUX that communicates with the recovered clock, a second clock and the buffer.

34. The physical layer device of claim 33 wherein the transmitter has a transmitter clock output that communicates with the buffer.

35. The physical layer device of claim 34, wherein the second clock includes a gigabit medium independent interface (GMII) clock.

36. A method for testing a physical layer device, the method comprising:
- coupling a plurality of digital circuits of a physical layer device to a medium-side interface of the physical layer device;
- transmitting data packets using a packet generating device over a medium to the medium-side interface of the physical layer device,
- wherein a transformer is arranged between the medium-side interface and the medium, and
- wherein the data packets travel through the plurality of digital circuits of the physical layer device and back to the packet generating device without traveling to a medium access controller.

37. The method of claim 36, further comprising selecting the plurality of digital circuits from a group including transmitters, receivers, digital signal processors (DSP), and physical coding sublayers (PCS).

38. The method of claim 36, further comprising comparing the transmitted data packets to received data packets to evaluate operation of the physical layer device.

* * * * *